US010755570B1

(12) United States Patent
Zhou (10) Patent No.: US 10,755,570 B1
(45) Date of Patent: Aug. 25, 2020

(54) SYSTEMS AND METHODS FOR MANAGING A PARKING FACILITY

(71) Applicant: Denso International America, Inc., Southfield, MI (US)

(72) Inventor: Yumeng Zhou, Southfield, MI (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 16/292,881

(22) Filed: Mar. 5, 2019

(51) Int. Cl.
*B60Q 1/48* (2006.01)
*G08G 1/14* (2006.01)
*G06Q 50/30* (2012.01)
*G06Q 10/02* (2012.01)
*B60W 30/06* (2006.01)

(52) U.S. Cl.
CPC ............. *G08G 1/143* (2013.01); *B60W 30/06* (2013.01); *G06Q 10/02* (2013.01); *G06Q 50/30* (2013.01)

(58) Field of Classification Search
CPC ........ G08G 1/143; B60W 30/06; G06Q 50/30
See application file for complete search history.

(56) References Cited

U.S. PATENT DOCUMENTS

| | | | |
|---|---|---|---|
| 6,502,011 B2 | 12/2002 | Haag | |
| 9,139,199 B2 | 9/2015 | Harvey | |
| 10,066,954 B1* | 9/2018 | Swanson | .............. G08G 1/0969 |
| 10,395,535 B2* | 8/2019 | Wang | ..................... G06Q 20/00 |
| 2008/0051951 A1* | 2/2008 | Camacho | ................ E04H 6/422 |
| | | | 701/23 |
| 2015/0123818 A1* | 5/2015 | Sellschopp | ........ G01C 21/3484 |
| | | | 340/932.2 |
| 2017/0337817 A1* | 11/2017 | Rosas-Maxemin | .... G06Q 10/02 |
| 2018/0232958 A1* | 8/2018 | Wang | ..................... G07F 17/24 |
| 2018/0335777 A1* | 11/2018 | Gibbs | .................. G05D 1/0088 |
| 2019/0304306 A1* | 10/2019 | Michalakis | ............ G08G 1/148 |

* cited by examiner

*Primary Examiner* — Phung Nguyen
(74) *Attorney, Agent, or Firm* — Christopher G. Darrow; Darrow Mustafa PC (57) ABSTRACT

System, methods, and other embodiments described herein relate to controlling a parking facility. In one embodiment, a method of controlling a parking facility control system is disclosed. In one approach, the method includes receiving a parking request for a vehicle. The parking request includes an identifier and a pickup time. The method includes selecting an initial parking space at the parking facility for the vehicle based, at least in part, on the identifier and the pickup time. The method includes transmitting a parking command to the vehicle. The parking command identifies the initial parking space and causes the vehicle to autonomously navigate to and park in the initial parking space.

17 Claims, 5 Drawing Sheets

SYSTEMS AND METHODS FOR MANAGING A PARKING FACILITY

TECHNICAL FIELD

The subject matter described herein relates to systems and methods for controlling the parking of vehicles in a parking facility, and, more particularly, to managing occupancy and distribution of parking spaces.

BACKGROUND

Parking in high traffic or highly populated areas can present a significant challenge. In parking facilities with limited amounts of parking spaces, the level of timeliness of users returning to retrieve vehicles and free up additional parking spaces can have ripple effects that retard efficient redistribution of parking spaces to incoming users.

Furthermore, fully and partially autonomous vehicles are becoming more prevalent, and such vehicles may be equipped to communicate with third-party systems and be fully capable of autonomously parking in a parking space. However, conventional parking facilities do not exploit these trends in any significant way that impacts the user experience at parking facilities or aids in improving levels of redistribution of parking spaces or overall efficiency in operation of the parking facilities.

SUMMARY

In one embodiment, example systems and methods for controlling a parking facility and managing distribution of parking spaces in the parking facility.

Therefore, a parking facility control system is disclosed. In one approach, the disclosed system includes one or more processors and a memory communicably connected to the one or more processors, storing a control module including one or more instructions that, when executed by the one or more processors, cause the one or more processors to select an initial parking space for a vehicle based, at least in part, on a parking request indicating an identifier and a pickup time, and a communication module including one or more instructions that, when executed by the one or more processors, cause the one or more processors to transmit a parking command to the vehicle, the parking command identifying the initial parking space and causing the vehicle to navigate to and park in the initial parking space.

In one embodiment a method of controlling a parking facility is disclosed. The method includes receiving, by a parking facility control system, a parking request for a vehicle, the parking request including an identifier and a pickup time, selecting, by the parking facility control system, an initial parking space at the parking facility for the vehicle based, at least in part, on the identifier and the pickup time, and transmitting a parking command to the vehicle. The parking command identifies the initial parking space and causes the vehicle to autonomously navigate to and park in the initial parking space.

In one embodiment, a non-transitory computer-readable medium is disclosed. The computer-readable medium stores instructions that when executed by one or more processors cause the one or more processors to perform the disclosed functions. The instructions include instructions to receive, by a parking facility control system, a parking request for a vehicle, the parking request including an identifier and a pickup time, select, by the parking facility control system, an initial parking space at the parking facility for the vehicle based, at least in part, on the identifier and the pickup time, and transmit a parking command to the vehicle. The parking command identifies the initial parking space and causes the vehicle to autonomously navigate to and park in the initial parking space.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and embodiments associated with controlling a parking facility and managing distribution of parking spaces in the parking facility are disclosed. The disclosed systems provides multiple improvements that enhance parking at a parking facility, including utilizing autonomous vehicle capabilities in drop-off and pickup of a vehicle, improving parking assignment predictions based on past behavior, and rewarding users who demonstrate a history of timely pickups, e.g., with reduced pricing, reduced wait times for pickups and advantageous parking space assignments.

In one embodiment, a parking facility control system receives a communication indicating that a user intends to utilize the facility. The communication can include an identifier for the user and a pickup time for the vehicle. The system can proceed to select a parking space for the vehicle based, at least in, part on: 1) the types of available spaces, 2) the pickup time, and 3) historical data indicating the user's timeliness in returning for pickups. The system can further transmit a parking command to a cause an autonomous or semi-autonomous vehicle to park in the selected parking space. Herein, an autonomous or semi-autonomous vehicle refers to a vehicle that is capable of at least a degree of moving, maneuvering, path finding or the like without direct manual control exerted by a human being.

Regarding the types of available spaces, the parking facility control system can categorize parking areas based on various factors, for example, proximity to an entry/exit point of the parking facility, presence of cover above the parking space, size of the parking space, additional security measures near the parking space, or the like. As an example, in a parking facility constructed to have five floors of parking above ground with fifty parking spaces per floor, the fifth floor being open with no roof, and a sole entry/exit point on the ground floor, the parking facility control system can categorize parking spaces on the fifth floor as one parking area, categorize parking spaces on the fourth floor as another parking area, and so on. Furthermore, the parking facility control system can use defined parking areas as differentials for applying greater value to highly desirable parking spaces within the parking facility. Such differentials can have an effect in a form of a reward system to encourage timely pickups, as will be discussed below.

Figure 1:
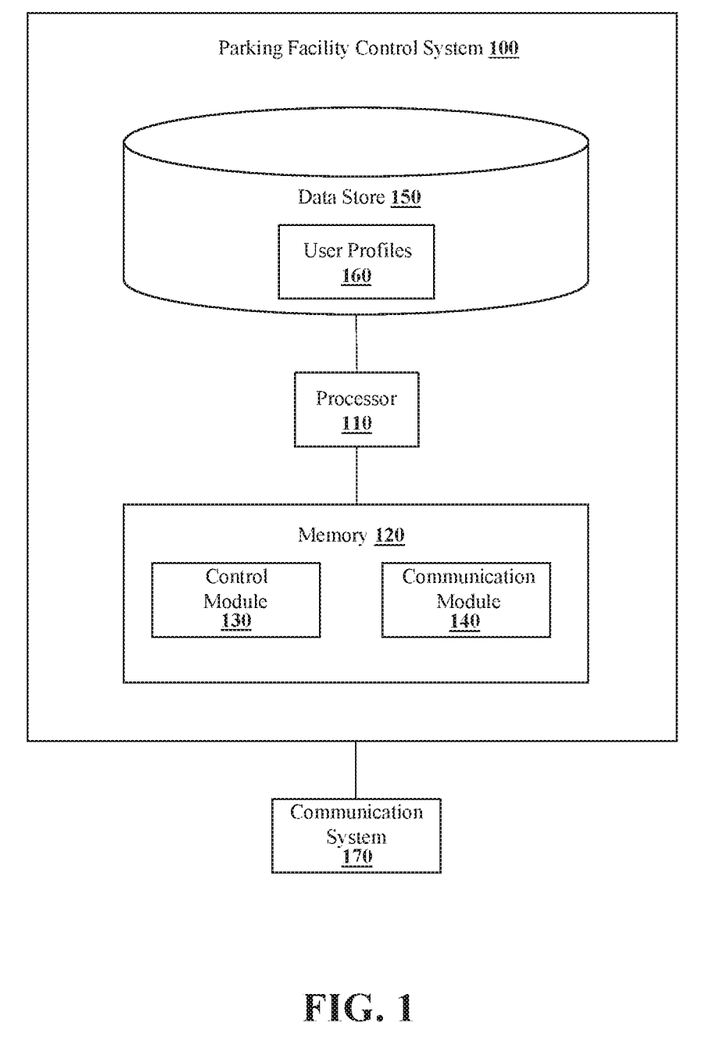
FIG. 1 illustrates one embodiment of a parking facility control system according to the disclosed subject matter.

Referring to FIG. 1, one embodiment of a parking facility control system 100 is illustrated. While arrangements will be described herein with respect to the parking facility control system 100, it will be understood that embodiments are not limited to a unitary system as illustrated. In some implementations, the parking facility control system 100 may be embodied as a cloud-computing system, a cluster-computing system, a distributed computing system (e.g., across multiple facilities), a software-as-a-service (SaaS) system, and so on. Accordingly, the parking facility control system 100 is illustrated and discussed as a single computing system for purposes of discussion but should not be interpreted to limit the overall possible configurations in which the disclosed components may be configured. For example, the separate modules, memories, databases, and so on may be distributed among various computing systems in varying combinations.

The parking facility control system 100 also includes various elements. It will be understood that in various embodiments and configurations depending on the actual layout and implementation, it may not be necessary for the parking facility control system 100 to have all of the elements shown in FIG. 1. The parking facility control system 100 can have any combination of the various elements shown in FIG. 1. Further, the parking facility control system 100 can have additional elements to those shown in FIG. 1. In some arrangements, the parking facility control system 100 may be implemented without one or more of the elements shown in FIG. 1. Further, while the various elements are shown as being located within the parking facility control system 100 in FIG. 1, it will be understood that one or more of these elements can be located external to the parking facility control system 100. Further, the elements shown may be physically separated by large distances.

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

The parking facility control system 100 is implemented to perform methods and other functions as disclosed herein relating to, for example, managing a parking facility, selecting and distributing parking spaces for incoming vehicles, setting parking prices, and directing autonomous or semi-autonomous vehicles. The noted functions and methods will become more apparent with a further discussion of the figures.

The parking facility control system 100 is shown as including a processor 110. In various implementations the processor 110 may be a part of the parking facility control system 100, the parking facility control system 100 may access the processor 110 through a data bus or another communication pathway, the processor 110 may be a remote computing resource accessible by the parking facility control system 100, and so on. In any case, the processor 110 is an electronic device such as a microprocessor, an ASIC, or another computing component that is capable of executing machine-readable instructions to produce various electronic outputs therefrom that may be used to control or cause the control of other electronic devices.

In one embodiment, the parking facility control system 100 includes a memory 120 that stores a control module 130 and a communications module 140. The memory 120 is a random-access memory (RAM), read-only memory (ROM), a hard-disk drive, a flash memory, or other suitable memory for storing the modules 130 and 140. The modules 130 and 140 are, for example, computer-readable instructions that when executed by the processor 110 cause the processor 110 to perform the various functions disclosed herein. In various embodiments, the modules 130 and 140 can be implemented in different forms that can include but are not limited to hardware logic, an ASIC, components of the processor 110, instructions embedded within an electronic memory, and so on.

The control module 130 can function to categorize parking spaces into distinct areas and select an initial parking space in an area for a vehicle based, at least in part, information received in a parking request, e.g., an identifier and a pickup time. The control module 130 can also determine a parking price based at least on the pickup time and a parking score associated with the identifier.

The communications module 140 can function to direct an autonomous vehicle to the selected parking space, for example, by transmitting a parking command to the vehicle. The parking command can include information that indicates a location of the initial parking space in the parking facility. The communications module 140 can also function to transmit various types of notifications and confirmation requests to a user, as will be discussed further below.

With continued reference to the parking facility control system 100, in one embodiment, the system 100 includes a data store 150, which may be implemented as a database 150. The database 150 is, in one embodiment, an electronic data structure stored in the memory 120, a distributed memory, a cloud-based memory, or another data store and that is configured with routines that can be executed by the processor 110 for analyzing stored data, providing stored data, organizing stored data, and so on. Thus, in one embodiment, the database 150 stores data used by the modules 130 and 140 in executing various determinations. In one embodiment, the database 150 stores data including user profiles 160.

The parking facility control system 100 can also include a communication system 170 that allows the communication module 140 to communicate with, for example, communication networks, vehicle systems, mobile computing devices, and other systems. The communication system 170 can be configured to communicate, for example, over a local area network, a wide area network, directly with a target system via an established protocol such as vehicle-to-everything (V2X), or through other communications methods.

Figure 2A:
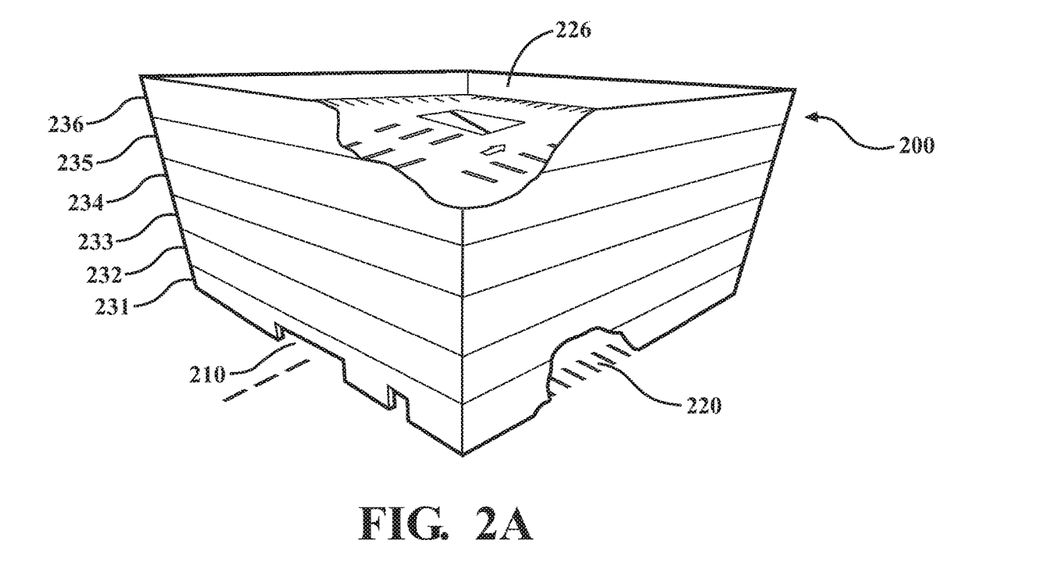
FIG. 2A illustrates a perspective view of a parking facility that can implement a parking facility control system according to the disclosed subject matter.
Figure 2B:
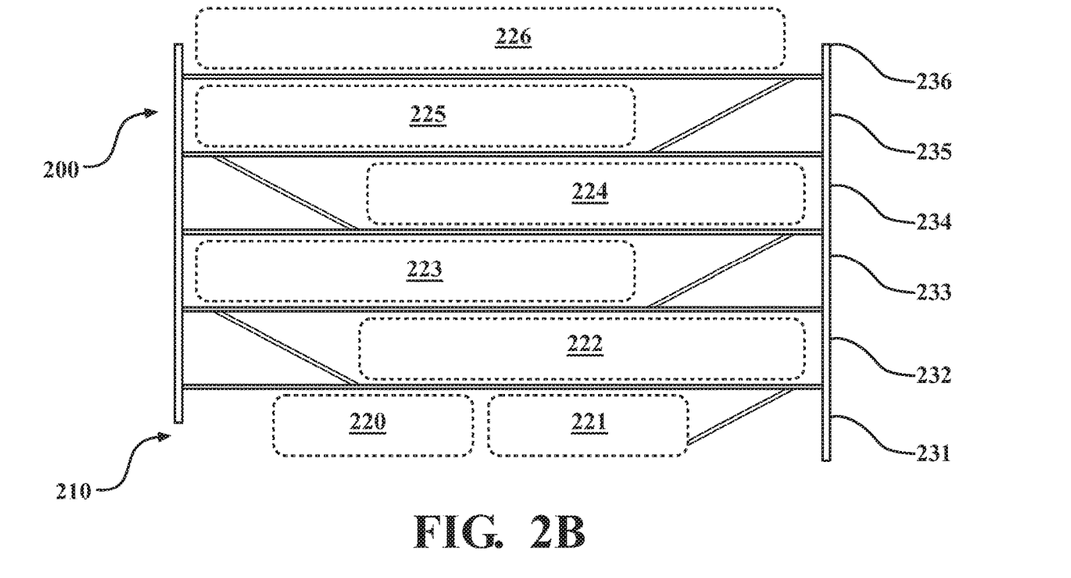
FIG. 2B illustrates a cut-away side view of a parking facility control system according to the disclosed subject matter.

FIGS. 2A and 2B illustrate views of an example parking facility 200 that can implement or be controlled by the disclosed parking facility control system 100. Although the facility 200 is depicted as a multi-floor structure, the disclosed subject matter is not limited to this particular implementation and can be applied to parking facilities of different layouts, configurations or sizes. For example, the disclosed subject matter can be applied to parking facilities comprised of multiple sites within a certain proximity. The parking facility 200 includes an entrance 210 and multiple floors (e.g., 231-236). The parking facility control system 100 can be installed at the parking facility 200 or at a remote location in communication with the facility 200.

The parking facility control system 100 can categorize parking areas (e.g., 220-226) in the parking facility 200. The categorization can be based on, for example, physical structure or various metrics that relate to comparative advantages. Such metrics can be determined based on features or characteristics that are specific to the facility 200 or generic factors. As an example of physical structure categorization, the system 100 can categorize parking areas in the facility 200 based on which floor the parking area is on. That is, the system 100 can categorize parking area 221 on the first floor 231 as a first area and a parking area 226 on the sixth floor 236 as a different area with respective floors therebetween also categorized uniquely. As an example of other types of categorization, in one or more embodiments the system 100 can categorize parking areas based on respective distances from the entrance 210 to the facility 200, proximity to stairwells, proximity to security devices, etc.

Figure 3:
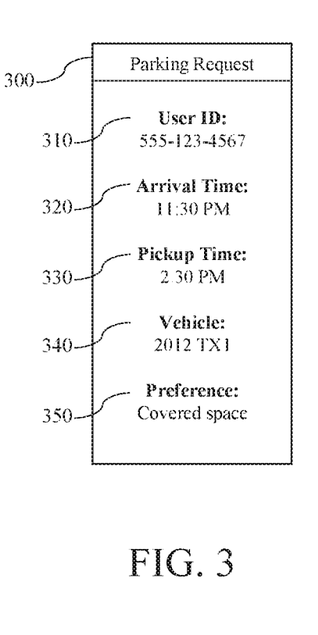
FIG. 3 illustrates an example representation of a parking request according to the disclosed subject matter.

In operation, in one or more embodiments the communication system 170 that is operably connected with the parking facility control system 100 can receive and relay a parking request from a user who intends to utilize the facility 200, i.e., to park a vehicle at the facility for an amount of time and return to retrieve the vehicle. FIG. 3 illustrates a representation of an example parking request 300. The user can complete the parking request 300, for example, via an application running on a mobile phone, a form on a website, a text message, or other communication form. The communication system 170 can receive the parking request 300 from, for example, a network communication from a mobile phone, a car phone, a computing device, or other communication device, and relay the information contained therein, e.g., to the control module 130.

The parking request 300 can include an identifier (ID) 310 that is associated with the user sending the request. The ID can be established as, for example, a phone number, a name, code, a vehicle identification number (VIN), or other ID. For example, in one or more embodiments the ID is an encoded ID created according to a protocol established for communication with the parking facility control system 100, where the encoded ID is not connected to any other information about the user to protect the user's privacy.

The parking request can further include an arrival time 320 and a pickup time 330. The arrival time 320 indicates a time or a window of time at which the user anticipates arriving at the facility to drop off his/her vehicle. The pickup time 330 indicates a time or a window of time at which the user anticipates returning to the facility 200 to retrieve his/her vehicle. In addition, as will be discussed below, the pickup time 330 functions as an indicator of the user's ability or tendency to accurately predict the user's own behavior.

The parking request 300 can further include additional information, such as vehicle information 340 (e.g., a model and year of the vehicle) and a parking preference 350. The parking preference 350 can be generic or specific to the facility 200. For example, in a hypothetical parking facility attached to a mall with multiple floor exits leading to different floors of the mall, a preference 350 could reference a particular store, theater or the like that the user intends to visit (e.g., "Near Super Store"). As another example, in a parking facility that has covered above-ground parking, uncovered above-ground parking, and underground parking, a preference 350 could indicate, "Covered above-ground parking."

Upon receiving the parking request 300 the control module 130 can check to see whether the ID 310 is already associated with one of the user profiles 160 in the database 150. If no corresponding profile exists, the system 100 can create a profile.

Figure 4:
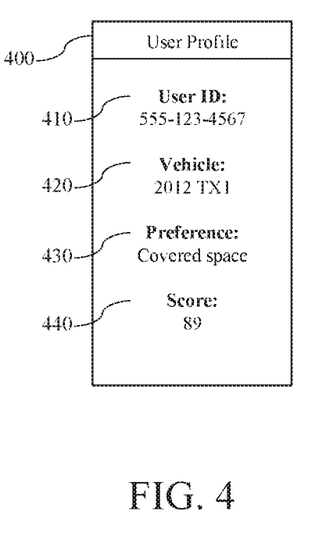
FIG. 4 illustrates an example representation of a user profile according to the disclosed subject matter.

FIG. 4 illustrates a representation of an example user profile 400. The user profile 400 can be a data structure that includes information such as the user's ID 410, the user's vehicle 420, user parking preferences 430 and a parking score 440 that reflects how often the user is timely in picking up the user's vehicle. The user profile 400 does not need to include each of the types of information shown in FIG. 4 and can include other types of information not shown.

In one or more embodiments, the control module 130 can select a parking space for the user based on, for example, the information in the user profile 400, a length of parking time that the vehicle is anticipated to remain at the facility 200 based on the pickup time 330, and other additional factors, such as the time of day, occurrence of a local special event, the number and type of available parking spaces, number/distribution of vehicles currently parked in the facility, or other factors, as will be discussed further below.

Figure 5:
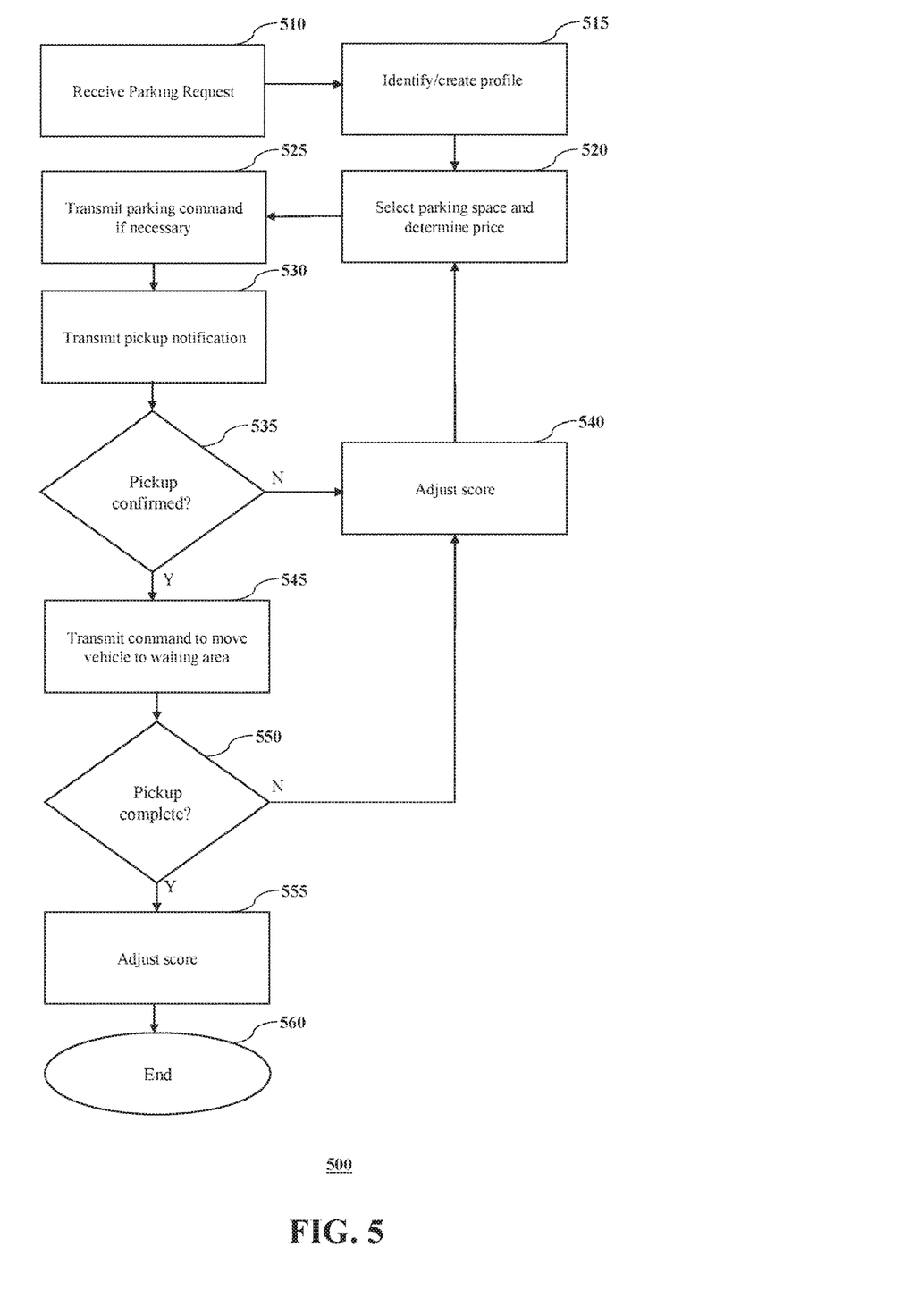
FIG. 5 illustrates a flow chart of a method of managing the parking of vehicles in a facility according to the disclosed subject matter.

FIG. 5 illustrates a flowchart of a method 500 that is associated with parking space selection and parking space management operations of the disclosed parking facility control system 100. The method 500 will be discussed from the perspective of the disclosed parking facility control system 100 of FIG. 1 and parking facility 200 of FIGS. 2A and 2B. While the method 500 is discussed in combination with the system 100 and facility 200, it should be appreciated that the method 500 is not limited to being implemented within system 100 and facility 200, which are merely one example of a system and facility that may implement the method 500.

At operation 510 the communication system 170 receives a parking request from a user and relays the information contained therein to the control module 130. In one or more embodiments, the parking request includes an ID and a pickup time. In other embodiments, the parking request includes additional information, such as vehicle information and user parking preferences.

At operation 515 the control module 130 identifies a profile associated with the ID, and if no profile exists, the control module 130 creates a new profile. The profile can be stored, for example, in the database 150. When creating a new profile, the control module 130 can assign the profile a neutral parking score. The parking score functions as an indicator of the user's historical trends regarding how accurate the user is in setting a pickup time and how timely a user is in following through to meet that pickup time. The parking score can be a numerical integer value, or some other form suitable to cover a range of measurements. For example, in one implementation the parking score can range from 0 to 100 with a score of 0 representing frequent untimeliness and a score of 100 representing frequent timeliness. In this example, the control module 130 may assign an initial neutral parking score of 50 to new profiles. Subsequent actions by the user can affect the parking score in a positive or negative way.

At operation 520 the control module 130 selects a parking space and determines a price for the parking space. In one or more embodiments, the control module 130 can utilize an algorithm that selects a parking space based on the parking score, available parking spaces in the facility 200, and the pickup time.

Regarding selection of the parking space, in one or more embodiments, the control module 130 can define parking areas based on one or more of a distance from an entrance/exit to the facility, a distance to a particular feature of the facility (e.g., an elevator, stairwell, direct store entry, etc.), or presence of other features (e.g., light, cover, security features, etc.). Referring back to FIG. 2B, in the example facility 200 the control module 130 can categorize parking areas to include a pickup area 220 and six parking areas: first parking area 221, second parking area 222, third parking area 223, fourth parking area 224, fifth parking area 225 and sixth parking area 226. The control module 130 categorizes the parking areas 221-226 based on their distance from the entry/exit point 210, where area 221 is the closest (ground level) and area 226 is the farthest (top level). In this example, the closer a given area is to the entry/exit point 210 the more preferential it may be considered, since it may be accessed faster.

In the selection algorithm, the parking score can function as a weight factor for preferential selection of a parking space according to the system-defined categories of parking areas in a given facility. This weight factor can be applicable in algorithms customized for specific features of a given parking facility. For example, at a time when multiple requests are received simultaneously listing preference for a particular area with limited parking available (e.g., a special event near a given area) at a facility, users with higher scores can be granted preferential assignment to the area.

In addition, the control module 130 can utilize parking space selection algorithms that attempt to improve traffic flow through the facility 200 via the parking space selections. For example, traffic flow throughout the entirety of the facility 200 can be reduced if vehicles that will remain parked at the facility 200 for a relatively short amount of time (e.g., an hour or less) are parked closer to the entry/exit point 210 than vehicles that will remain parked at the facility 200 for a relatively long amount of time (e.g., three or more hours). However, the usefulness of this observation as it applies to selecting a parking space depends on how accurate the control module 130 is in predicting the actual parking times of vehicles based on the parking requests.

Accordingly, the control module 130 can improve actual parking time predictions by rating the accuracy of user's pickup time predictions with the parking score. That is, in one or more embodiments, the control module 130 lowers a user parking score in response to late pickups/repeated extensions, and increases the user parking score in response to timely pickups.

Returning to FIG. 5 for operation perspective, recall at operation 520 the control module 130 utilizes the pickup time from the parking request and the parking score from the user profile in selecting a parking space from among the available parking spaces. Since the parking score functions as an indicator of past timeliness and accuracy, given two users, A and B, that both submit parking requests with identical pickup times, if $A_{ParkingScore} > B_{ParkingScore}$ the control module 130 can select a parking space for B in a parking area that is farther away from the exit/entry point than a parking space selected for A.

Figure 6:
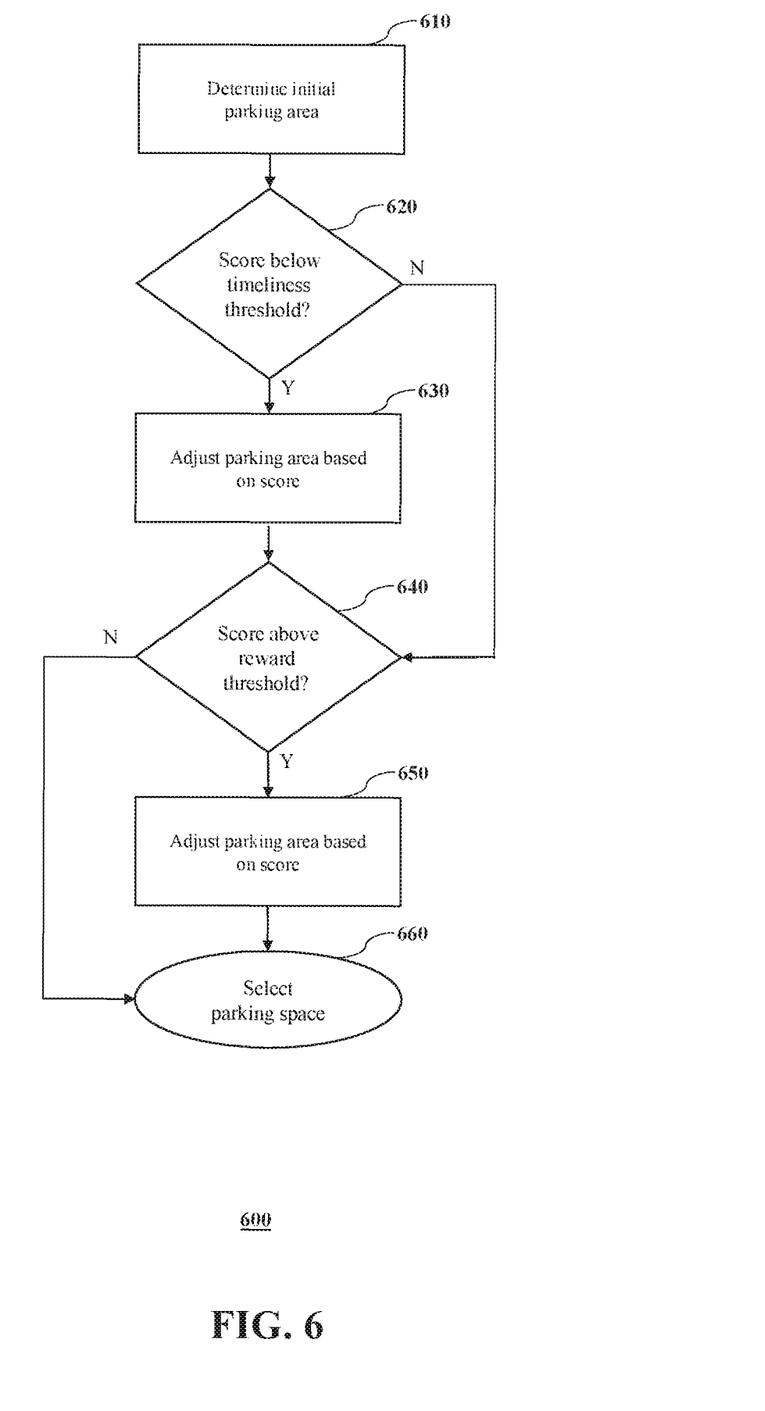
FIG. 6 illustrates a flow chart of a method of selecting a parking space according to the disclosed subject matter.

FIG. 6 illustrates a flowchart 600 of an example process by which the control module 130 can select a parking space based on a parking request received from user B having a parking score $B_{ParkingScore}$. At operation 610 the control module 130 can select an initial parking area as a function of the pickup time received in the parking request. For example, in one embodiment the function may be defined as:

$$\text{Parking Area} = \left\lceil \frac{A(P_T - \text{Min}_T)}{(\text{Max}_T - \text{Min}_T)} \right\rceil$$

where A is the total number of areas, $P_T$ is the total estimated parking time based on the received pickup time, $\text{Min}_T$ is a minimum threshold time and $\text{Max}_T$ is a maximum threshold time. Effectively, Eq. 1 maps a parking time $P_T$ to a parking area, where the closer $P_T$ is to the minimum threshold $\text{Min}_T$ the lower the parking area will be, and the closer $P_T$ is to the maximum threshold $\text{Max}_T$ the higher the parking area will be (i.e., further away from the entry/exit point 210). In implementing this function any parking time $P_T$ less than $\text{Min}_T$ is set to $\text{Min}_T$, resulting in selecting the lowest parking area, and conversely any $P_T$ greater than $\text{Max}_T$ is set equal $\text{Max}_T$, resulting in selecting the highest parking area.

As an example, implemented in the facility 200, the control module 130 can define six parking areas (A=6), a minimum threshold time of fifteen minutes ($\text{Min}_T$=15) and a maximum threshold time of four hours ($\text{Max}_T$=240 minutes). Assume that the parking request from user B includes a pickup time that equates to 120 minutes of parking time (e.g., the current time is 12:00 and the submitted pickup time is 2:00). In this case, the system 100 will identify the third parking area 223 as the initial parking area, i.e.:

$$3 = \left\lceil \frac{6(120 - 15)}{(240 - 15)} \right\rceil$$

However, the initial parking area is not necessarily the final selected parking area from which the parking space will be assigned. In one or more embodiments, the control module 130 can determine whether the initial parking area should be adjusted, for example, based on past patterns of timely behavior or untimely behavior, based on any known preferences and/or based on actual availability. For example, the control module 130 can define a "timeliness threshold" such that a parking score below the timeliness threshold is interpreted as indicating a pattern of late pickups and/or extensions, and a "reward threshold" such that a parking score above the reward threshold is interpreted as indicating a pattern of timely pickups.

Following this approach, at operation 620 the control module 130 checks whether user B has a parking score $B_{ParkingScore}$ that is below the timeliness threshold. If $B_{ParkingScore}$<timeliness threshold, at operation 630 the control module 130 can adjust selection of the parking area to a less advantageous parking area, for example, by selecting a parking area that is further away than the initial parking area. In the example above, the control module 130 could shift the selection of the initial parking area from third parking area 223 to fourth parking area 224. In this manner the past behavior of user B has affected the selection negatively and the operations of the disclosed parking facility control system 100 provide an incentive for user B to improve his/her actions in terms of timeliness when utilizing the facility.

At operation 640 the control module 130 checks whether user B has a parking score $B_{ParkingScore}$ that is greater than the reward threshold. If $B_{ParkingScore}$>reward threshold, at operation 650 the control module 130 can adjust selection of the parking area to provide an improvement if possible, for example, by selecting a parking area that satisfies user preferences included in the parking request or user profile, or selecting a parking area that is closer to the entry/exit point 210 when the initially selected parking area is full. In this manner, the disclosed parking facility control system 100 promotes behavior that aids in efficient operation of the facility 200. At operation 660 the control module 130 determines the final selection of the parking space from the selected parking area.

Thus, returning to FIG. 5, at operation 520 the control module 130 selects a parking space, for example, in the manner described above, and determines a price for the parking space. The price can be determined as a function of the parking area and the pickup time. For example, the control module 130 can assign a separate hourly parking rate to each parking area based on the respective distance from the entry/exit point 210. The price can be adjusted based on the parking score, e.g., the control module 130 can allot a discount if the parking score is above the reward threshold or some other threshold level. The communication module 140 can transmit the parking price to the user and prompt the user to confirm acceptance of the parking price.

At operation 525, when the vehicle arrives at the facility 200 to park, the communication module 140 can direct the vehicle to park. In one embodiment, the communication module directs the vehicle based, at least in part, on whether the vehicle is an autonomous or semi-autonomous vehicle or a manual vehicle.

In the case of the vehicle being an autonomous or semi-autonomous vehicle capable of self-parking, the communication module 140 directs the vehicle by transmitting a "parking command" to the vehicle. The parking command can include instructions that enable the vehicle to navigate to a given parking space. The instructions can include, for example, a parking space number, a facility map/floor plan, a coordinate, a turn by turn instruction list, or the like. Thus, upon arrival at the facility 200 the user can exit the vehicle and depart to allow the vehicle to autonomously navigate to the assigned parking space.

In the case of the vehicle not having suitable autonomous capability, not being configured to communicate with the communication module 140, or in some other way being incapable of executing the parking command, the communication module 140 can transmit the parking command to a communication device associated with the user or to a worker at facility 200, with the command including human readable instructions such as the parking space number, so that the user (or a worker) can manually navigate the vehicle to the selected parking space and park the vehicle.

At operation 530, when the pickup time that was received in the parking request is approaching, at a set amount of time, e.g. ten minutes, prior thereto, the communication module 140 can transmit a pickup notification to the user via the communication system 170. The pickup notification can be transmitted, for example, via a text message, an email, a robocall, or the like. The pickup notification notifies the user that the pickup time is approaching and requests confirmation that user will retrieve the vehicle at the pickup time, or confirmation that the user will not retrieve the vehicle at the pickup time and instead intends to request an extension of parking time. If the user does not respond or responds with a request for an extension of time, at operation 540 the control module 130 may adjust the parking score, e.g., lower the score by an incremental amount to represent the occurrence of the user failing to meet the original pickup time. Operational flow then returns to operation 520 for the control module 130 to select a parking space and determine the price for the continued time. In this cycle, if the parking score has not fallen below the timeliness threshold, the control module 130 may select the same parking space and therefore no change is necessary. However, if the score has fallen below the timeliness threshold, or other circumstance have changed (e.g., increased demand of parking), the control module 130 may select a new parking space for the vehicle, e.g., in a parking area that is farther away than the current parking area. In this case at operation 525 the communication module 140 will transmit a parking command to move the vehicle to the newly selected parking space.

Conversely, if the user confirms the pickup at operation 535, then at operation 545 the communication module 140 transmits a parking command that causes the vehicle to be moved (i.e., autonomously or manually by a worker, depending on capability) to a parking space in the pickup area 220. As shown in FIG. 2B, the pickup area 220 can be a parking area near an entry/exit point 210 of the facility 200, however, this is only one example layout. In implementation the pickup area 220 can be disposed in other locations, such as near a store entrance, near an elevator, or other locations.

The pickup area 220 can include sensors that allow that system 100 to detect the presence or absence of a vehicle that has been assigned to a pickup area 220 parking space. In one or more embodiments, the vehicle can communicate directly with the system 100, for example, through V2X communication to notify the system 100 of its location/departure. Thus, the system 100 can determine when the vehicle arrives at the pickup area 220 and whether the user has arrived and driven the vehicle out of the pickup area 220.

At operation 550 the system 100 waits for an amount of time and checks whether the pickup has been completed, i.e., the user has arrived, picked up the vehicle and left the facility. In one or more embodiments, the amount of time that the system allows the vehicle to remain in the pickup area 220 can be a function of the user score. For example, the higher the score, the more time the system 100 allows for the vehicle to remain in the pickup area 220, as high score users have demonstrated a likelihood of completing a pickup. However, if the system 100 detects that the vehicle has not been picked up by the expiration of the allotted time, then the control module 130 executes operation 540 to adjust the score (i.e. reduction) and cycles back to operation 520 to select a new parking space and determine a price for the extended parking time. That is, the control module can adjust a parking score associated with the user profile based on whether the vehicle is removed from the parking facility within a determined time range of the original pickup time estimate.

Conversely, if the system 100 detects that the pickup has been completed, then at operation 555 the control module 130 adjusts the score accordingly (i.e., increase) and the process ends at operation 560.

In addition to the above described configurations, it should be appreciated that the parking facility control system 100 from FIG. 1 can be configured in various arrangements with separate integrated circuits and/or chips. In such embodiments, the identification module 130 from FIG. 1 can be embodied as a separate integrated circuit. Additionally, the control module 130 and communication module 140 can each be embodied on individual integrated circuits. The circuits can be connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits. In another embodiment, the modules 130 and 140 may be combined into a separate application-specific integrated circuit. In further embodiments, portions of the functionality associated with the modules 130 and 140 may be embodied as firmware executable by a processor and stored in a non-transitory memory. In still further embodiments, the modules 130 and 140 are integrated as hardware components of the processor 110.

In another embodiment, the described methods and/or their equivalents may be implemented with computer-executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies (e.g., method 200 of FIG. 2) are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The parking facility control system 100 can include one or more processors 110. In one or more arrangements, the processor(s) 110 can be a main processor of the parking facility control system 100. For instance, the processor(s) 110 can be an electronic control unit (ECU). The parking facility control system 100 can include one or more data stores for storing one or more types of data. The data stores can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, distributed memories, cloud-based memories, other storage medium that are suitable for storing the disclosed data, or any combination thereof. The data stores can be a component of the processor(s) 110, or the data store can be operatively connected to the processor(s) 110 for use thereby. The term "operatively connected," as used throughout this description, can include direct or indirect connections, including connections without direct physical contact.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A parking facility control system for a parking facility, comprising
   one or more processors; and
   a memory communicably connected to the one or more processors and storing:
   a control module including one or more instructions that, when executed by the one or more processors, cause the one or more processors to select an initial parking space for a vehicle based, at least in part, on a parking request indicating an identifier and a pickup time, the identifier being associated with a user profile; and
   a communication module including one or more instructions that, when executed by the one or more processors, cause the one or more processors to transmit a parking command to the vehicle, the parking command identifying the initial parking space and causing the vehicle to navigate to and park in the initial parking space,
   wherein the control module further includes instructions to adjust a parking score associated with the user profile based on whether the vehicle is removed from the parking facility within a time range of the pickup time.

2. The parking facility control system of claim 1, wherein the parking command includes information that indicates a location of the initial parking space in the parking facility.

3. The parking facility control system of claim 1, wherein the control module further includes instructions to determine a parking price based at least on the pickup time and the parking score, and the communication module further includes instructions to transmit the parking price to a user associated with the identifier and prompt the user to confirm acceptance of the parking price.

4. The parking facility control system of claim 1, wherein the control module further includes instructions that categorize parking spaces into at least a first parking area and a second parking area in the parking facility, the first parking area being closer to an entry point of the parking facility than the second parking area, and further includes instructions to change selection of the initial parking space from a parking space in the first parking area to a parking space in the second parking area when the parking score is below a threshold score value.

5. The parking facility control system of claim 1, wherein the communication module includes instructions to, at a set amount of time prior to expiration of the pickup time, transmit a notification to a user associated with the identifier, prompting the user to transmit a confirmation of a pending pick-up or a request for additional parking time.

6. The parking facility control system of claim 1, wherein the control module further includes instructions that categorize a set of parking spaces in the parking facility as a pickup area, and the communication module includes instructions to, at a set time before the pickup time, transmit a second parking command to the vehicle that causes the vehicle to park in the pickup area.

7. The parking facility control system of claim 6, wherein:
the control module further includes instructions that categorize parking spaces into at least a first parking area and a second parking area in the parking facility, the first parking area being closer to an entry point of the parking facility than the second parking area and the initial parking space being in the first parking area, and
when the vehicle remains in the pickup area for longer than a wait-time amount, the communication module includes instructions to transmit a third parking command to the vehicle that causes the vehicle to navigate to and park in a secondary parking space located in the second parking area.

8. The parking facility control system of claim 7, wherein a length of the wait-time amount is based at least in part on a parking score associated with the user profile.

9. A method of controlling a parking facility, comprising
receiving a parking request for a vehicle, the parking request including an identifier and a pickup time, the identifier being associated with a user profile;
selecting an initial parking space at the parking facility for the vehicle based, at least in part, on the identifier and the pickup time;
transmitting a parking command to the vehicle, the parking command identifying the initial parking space and causing the vehicle to autonomously navigate to and park in the initial parking space; and
adjusting a parking score associated with the user profile based on whether the vehicle is removed from the parking facility within a time range of the pickup time.

10. The method of claim 9, wherein the parking command includes information that indicates a location of the initial parking space in the parking facility.

11. The method of claim 9, further comprising:
determining a parking price based at least on the pickup time and the parking score; and
transmitting the parking price to a user associated with the identifier to prompt the user to confirm acceptance of the parking price.

12. The method of claim 9, further comprising:
categorizing parking spaces into at least a first parking area and a second parking area in the parking facility, the first parking area being closer to an entry point of the parking facility than the second parking area;
changing selection of the initial parking space from a parking space in the first parking area to a parking space in the second parking area when the parking score is below a threshold score value.

13. The method of claim 9, further comprising, at a set amount of time prior to expiration of the pickup time, transmitting a notification to a user associated with the identifier that prompts the user to transmit a confirmation of a pending pick-up or a request for additional parking time.

14. The method of claim 9, further comprising:
categorizing a set of parking spaces in the parking facility as a pickup area; and
at a set time before the pickup time, transmitting a second parking command to the vehicle that causes the vehicle to park in the pickup area.

15. The method of claim 14, further comprising:
categorizing parking spaces into at least a first parking area and a second parking area in the parking facility, the first parking area being closer to an entry point of the parking facility than the second parking area and the initial parking space being in the first parking area; and
when the vehicle remains in the pickup area for longer than a wait-time amount, transmitting a third parking command to the vehicle that causes the vehicle to navigate to and park in a secondary parking space located in the second parking area.

16. The method of claim 15, wherein a length of the wait-time amount is based at least in part on a parking score associated with the user profile.

17. A non-transitory computer-readable medium storing instructions for controlling a parking facility and that when executed by one or more processors cause the one or more processors to:
receive a parking request for a vehicle, the parking request including an identifier and a pickup time, the identifier being associated with a user profile;
select an initial parking space at the parking facility for the vehicle based, at least in part, on the identifier and the pickup time;
transmit a parking command to the vehicle, the parking command identifying the initial parking space and causing the vehicle to autonomously navigate to and park in the initial parking space; and
adjust a parking score associated with the user profile based on whether the vehicle is removed from the parking facility within a time range of the pickup time.

* * * * *